United States Patent
Kaltenbach et al.

(10) Patent No.: US 8,292,779 B2
(45) Date of Patent: Oct. 23, 2012

(54) METHOD FOR OPERATING A DRIVE TRAIN

(75) Inventors: Johannes Kaltenbach, Friedrichshafen (DE); Kai Borntraeger, Langenargen (DE); Axel Michael Mueller, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 301 days.

(21) Appl. No.: 12/868,261

(22) Filed: Aug. 25, 2010

(65) Prior Publication Data

US 2011/0053734 A1 Mar. 3, 2011

(30) Foreign Application Priority Data

Aug. 31, 2009 (DE) .......................... 10 2009 029 036

(51) Int. Cl.
*B60W 10/08* (2006.01)
(52) U.S. Cl. ......................................................... 477/5
(58) Field of Classification Search .. 477/5; 180/65.265
See application file for complete search history.

(56) References Cited

U.S. PATENT DOCUMENTS 6,202,776 B1 * 3/2001 Masberg et al. ............ 180/65.22
7,237,634 B2 * 7/2007 Severinsky et al. ........ 180/65.23

* cited by examiner

*Primary Examiner* — Dirk Wright

(57) ABSTRACT

A method of operating a drive train having a hybrid drive that comprises an internal combustion engine and an electric machine, a clutch connected between the combustion engine and electric machine, a transmission connected between the electric machine and an output drive, and a start-up element connected between the electric machine and the output drive. The method for starting-up the drive train, when the clutch connected between the combustion engine and the electric machine and the start-up element are both disengaged, and the electric machine is stopped and short-circuited. The method comprising the steps of accelerating the internal combustion engine to a rotational speed which depends on a short circuit torque of the electric machine that must be overcome; engaging the clutch connected between the combustion engine and electric machine; and bringing the combustion engine to a start-up speed depending on the driver's request; and engaging the start-up element.

8 Claims, 2 Drawing Sheets

METHOD FOR OPERATING A DRIVE TRAIN

This application claims priority from German patent application serial no. 10 2009 029 036.2 filed Aug. 31, 2009.

FIELD OF THE INVENTION

The invention relates to a method for operating a drive train of a motor vehicle.

BACKGROUND OF THE INVENTION

The main components of a drive train are a drive assembly and transmission. The transmission converts rotational speeds and torques, and provides the tractive power of the drive assembly at an output drive of the drive train. The present invention relates to a method for operating a drive train having a drive assembly designed as a hybrid drive, wherein a clutch is connected between the combustion engine of the hybrid drive and its electric machine, and a further friction element, which is disposed internally or externally to the transmission, and which is designed as a clutch or brake and is serving as a further drive element, is connected between the electric machine and the output drive.

The electric machine of a hybrid drive can be operated as a motor or as a generator. When the electric machine of the hybrid drive operates as a motor, it converts electrical energy into mechanical energy for supplying drive torque. When the electric machine of the hybrid drive operates as a generator, it converts mechanical energy into electrical energy to charge, for example, an electrical energy accumulator of the hybrid drive.

Under certain circumstances it can be necessary for the electric machine of the hybrid drive to exhibit a neutral behavior with respect to the electrical energy accumulator of the drive train, that is, the electric machine neither charges nor discharges the electrical energy accumulator. In this case, the electric machine of the hybrid drive is short circuited.

In particular, if the electric machine is designed as a permanent magnet synchronous machine (PSM), during acceleration of a short-circuited electric machine from a stopped state, short-circuit behavior can be observed in which a relatively high torque must be overcome at the electric machine in order to drive the machine up to a target rotational speed, or to accelerate it, from a stopped state. Then, accordingly, if a drive train with a hybrid drive and a short-circuited electric machine is to be started up, the electric machine strongly brakes at relatively low rotational speeds, which impacts the start-up behavior negatively. To date, there are no known methods for operating a drive train with a hybrid drive that create reliable and comfortable start-up with a short-circuited electric machine.

SUMMARY OF THE INVENTION

Starting from this state, the object of the present invention is to provide a novel method for operating a drive train of a motor vehicle.

According to the invention, if the clutch that is connected between the internal combustion engine and the electric machine, and the start-up element disposed internally or externally to the transmission, are disengaged, and the electric machine is stopped and short-circuited, then for starting-up the drive train, a) the internal combustion engine is initially accelerated to a rotational speed which depends on a short circuit torque of the electric machine that must overcome; b) then, the clutch connected between the internal combustion engine and electric machine is engaged; and c) following that, the internal combustion engine is brought to a start-up rotational speed depending on the driver request, and the start-up element that is disposed internally or externally to the transmission is engaged.

The present invention proposes a method for operating a drive train with a hybrid drive, in which a reliable and comfortable start-up is possible even with a short-circuited electric machine.

BRIEF DESCRIPTION OF THE DRAWINGS

An embodiment of the invention is described in more detail, without being restricted thereto, based on the figures. They show.

DETAILED DESCRIPTION OF THE PREFERRED EMBODIMENTS

The present invention for operating a drive train of a motor vehicle is described in detail with reference to the FIGS. 1 to 3.

Figure 1:
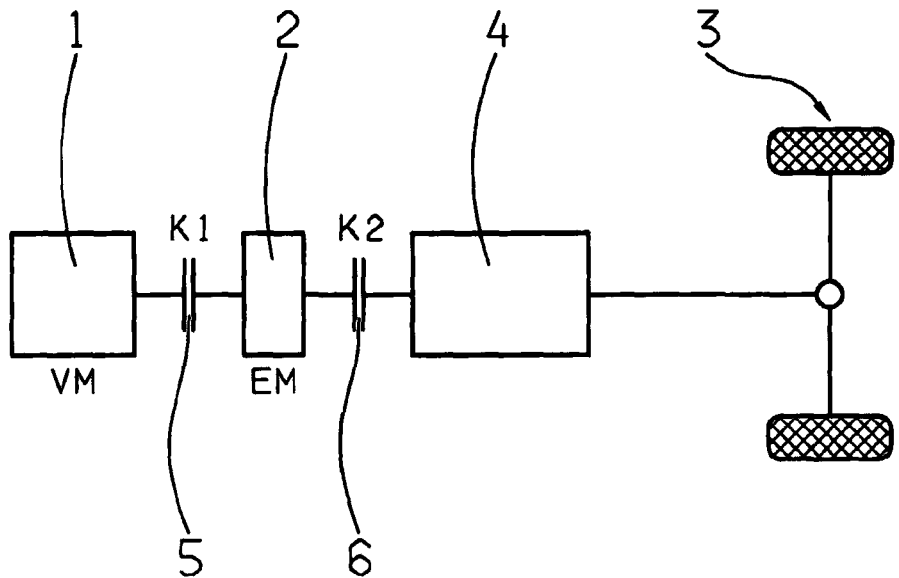
FIG. 1 an example drive train schematic of a motor vehicle in which the method according to the invention can be used.

FIG. 1 shows, highly schematically, a possible drive train in which the method according to the invention can be used. FIG. 1 shows a drive train with a hybrid drive, wherein a hybrid drive comprises an internal combustion engine 1 and an electric machine 2. A transmission 4 is connected between the hybrid drive that is formed by the internal combustion engine 1 and the electric machine 2, and an output drive 3, wherein the transmission 4 provides a tractive power of the hybrid drive at the output drive 3.

A clutch 5 that is connected between the internal combustion engine 1 of the hybrid drive and its electric machine 2, is disengaged when the internal combustion engine 1 is decoupled from the output drive 3.

In the embodiment in FIG. 1, a start-up element that is disposed externally to the transmission and is designed as a clutch 6, is connected between the electric machine 2 and the transmission 4. The startup element can also be designed also as a clutch or brake internal to the transmission.

A transmission with a constant ratio can be connected between a rotor of the electric machine 2 and a mechanical shaft, which in the embodiment of FIG. 1 is connected to the clutches 5 and 6.

The drive train of FIG. 1 is a parallel hybrid drive train. In addition to the components shown in FIG. 1, this drive train has an electric energy accumulator and control-side assemblies.

The electric machine 2 of such a drive train can be operated as a motor and as a generator. Operating as a motor, the electric machine 2 of the hybrid drive discharges the electrical energy accumulator and converts the electrical energy into mechanical energy in order to provide a drive torque at the output drive 3. In contrast, during generator operation, for instance during braking of the drive train, the electric machine 2 of the hybrid drive operates as a generator in order to charge the electrical energy accumulator of the drive train.

In certain operating states of the drive train, it can be necessary for the electric machine 2 of the hybrid drive to have an electrically neutral behavior with respect to the electrical energy accumulator, not shown. In this case, the electrical machine 2 is short-circuited.

Figure 2:
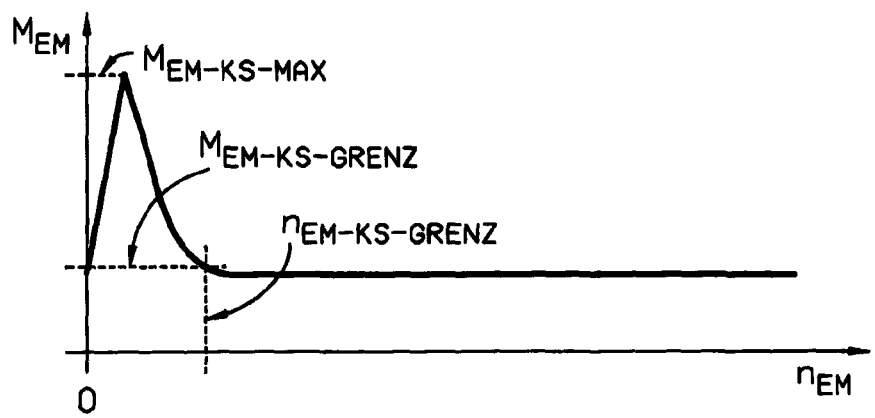
FIG. 2 a diagram for clarifying the behavior of a short-circuited electric machine.

FIG. 2 shows a diagram in which the short-circuit behavior of an electric machine 2 of a hybrid drive that is designed as a permanent magnet synchronous machine is shown, wherein in FIG. 2 the braking torque $M_{EM}$ of the electric machine 2 in short circuit operation is plotted against its rotational speed $n_{EM}$. Other electric machines 2 can display a similar short circuit behavior.

As shown in FIG. 2, when an electric machine 2 in short circuit operation is to be accelerated from a stop ($n_{EM}$=0), initially at relatively low rotational speeds the torque $M_{EM}$ to be overcome increases to a maximum value, or short circuit torque $M_{EM\text{-}KS\text{-}MAX}$, and subsequently decreases to the value $M_{EM\text{-}KS\text{-}GRENZ}$, wherein when the electric machine 2 in short circuit operation has attained the rotational speed $n_{EM\text{-}KS\text{-}GRENZ}$, the torque to be overcome in the short circuit operation of the electric machine 2 remains approximately the same. The short circuit torque is a characteristic value that depends on the electric machine 2.

Therefore, in short circuit operation of the electric machine 2, the problem exists that the electric machine 2 at relatively low rotational speeds $n_{EM}$ brakes relatively strongly, which has a negative influence particularly on the start-up behavior of a drive train with a hybrid drive.

Accordingly, the present invention relates to such details for operating a drive train with a hybrid drive, in which a reliable start-up with a high level of comfort is possible with a short circuited electric machine 2. The method according to the invention is described in the following in detail with reference to FIG. 3.

For the start-up of a drive train having a hybrid drive with a short circuited electric machine 2, it is assumed that at time t=0 the drive train has an initial state in which the internal combustion engine 1 is operated at an idling speed $n_{VM\text{-}LEER}$, in which the electric machine 2 of the hybrid drive is stopped ($n_{EM}$=0) and in which both the clutch 5, which is also labeled as clutch K1, that is connected between the internal combustion engine 1 and electric machine 2, as well as the start-up element, which in the embodiment in FIG. 1 is designed as a clutch 6 disposed internally or externally to the transmission and that is also labeled as clutch K2, are disengaged.

In order to start-up a drive train having a hybrid drive whose electric machine 2 is short circuited, starting from such an initial state of the drive train, first the internal combustion engine 1 is accelerated from its idling speed $n_{VM\text{-}LEER}$ to a rotational speed $n_{VM\text{-}KS}$ which depends on the short circuit torque $M_{EM\text{-}KS\text{-}MAX}$ of the short circuited electric machine 2 of the hybrid drive that must be overcome. The greater the short circuit torque $M_{EM\text{-}KS\text{-}MAX}$ of the short circuited electric machine 2, the faster the rotational speed $n_{VM\text{-}KS}$ to which the internal combustion engine 1 is accelerated.

Figure 3:
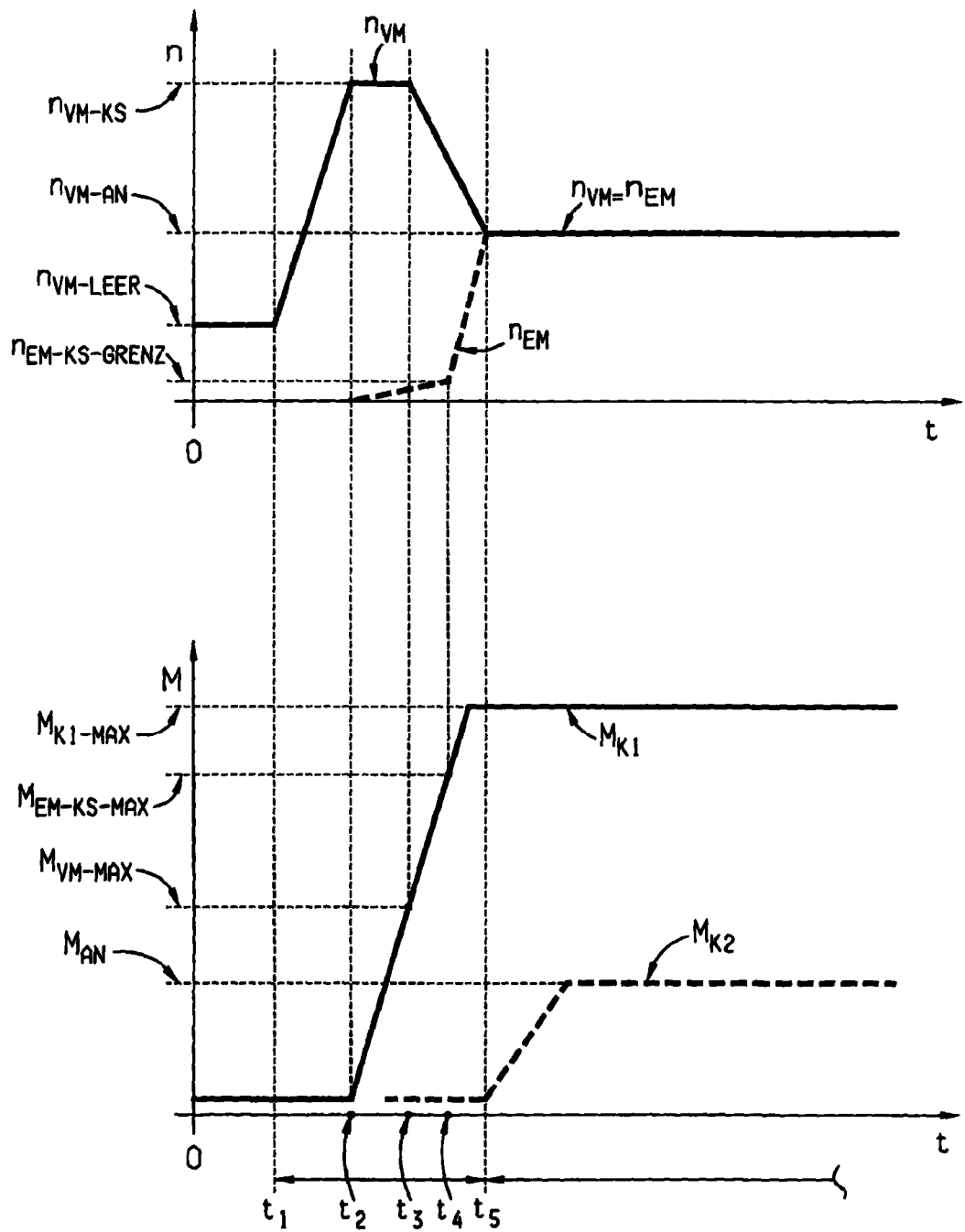
FIG. 3 a diagram for clarifying the method according to the invention.

The acceleration of the internal combustion engine 1 starting from its idle speed $n_{VM\text{-}LEER}$ to the rotational speed $n_{VM\text{-}KS}$, which depends on the short circuit torque to be overcome, occurs according to FIG. 3 between time $t_1$ and $t_2$, wherein during this time span a speed control of internal combustion engine 1 occurs via the torque provided by the internal combustion engine. According to FIG. 3, the rotational speed of the internal combustion engine 1 increases linearly along a ramp from the idle speed $n_{VM\text{-}LEER}$ to the rotational speed $n_{VM\text{-}KS}$ that depends on the short circuit torque to be overcome. This rotational speed increase can also occur non-linearly.

Then, following the acceleration of the internal combustion engine 1 to the rotational speed $n_{VM\text{-}KS}$, which depends on the short circuit torque $M_{EM\text{-}KS\text{-}MAX}$ to be overcome, that is, starting at time $t_2$, the clutch 5, that is clutch K1, that is connected between the internal combustion engine 1 and the electric machine 2 of the hybrid drive, is engaged, wherein in the embodiment of FIG. 3, the engagement of clutch 5 occurs linearly along a ramp. The engagement of the clutch 5 can occur non-linearly in this case as well.

It should be noted that preferably, temporally parallel to the acceleration of the internal combustion engine 1 to the rotational speed $n_{VM\text{-}KS}$, which depends on the short circuit torque $M_{EM\text{-}KS\text{-}MAX}$ of the electric machine 2 that must be overcome, that is, during the time span between $t_1$ and $t_2$, the clutch 5, connected between the internal combustion engine 1 and the electric machine 2 of the hybrid drive, is partially engaged up to the contact point so that at $t_2$ the clutch 5, connected between the internal combustion engine 1 and the electric machine 2, can be engaged further starting from the contact point, so that it couples the internal combustion engine 1 to the electric machine 2 immediately at time $t_2$.

Starting at time $t_2$, the electric machine 2 is accelerated, wherein when the internal combustion engine 1 has attained the maximum torque $M_{VM\text{-}MAX}$ it can provide at time $t_3$, then the rotational speed of the internal combustion engine $n_{VM}$ is decreased again. Upon engaging the clutch 5, connected between the internal combustion engine 1 and the electric machine 2, the resulting rotational speed $n_{VM}$ of the internal combustion engine 1 is preferably monitored, wherein when the rotational speed $n_{VM}$ of the internal combustion engine 1 falls below a limit value, the clutch 5 connected between the internal combustion engine 1 and the electric machine 2 is disengaged again, in order to restart the start-up procedure by increasing the rotational speed $n_{VM\text{-}KS}$ that depends on the short circuit torque $M_{EM\text{-}KS\text{-}MAX}$ to be overcome.

In FIG. 3 the short circuit torque $M_{EM\text{-}KS\text{-}MAX}$ of the short-circuited electric machine 2 is greater than the maximum torque $M_{VM\text{-}MAX}$ that can be provided by the internal combustion engine, wherein in FIG. 3 at time $t_4$ the clutch 5, connected between the internal combustion engine 1 and the electric machine 2, that is the clutch K1, transfers the short circuit torque $M_{EM\text{-}KS\text{-}MAX}$, so that starting at time $t_4$ the electric machine is accelerated more strongly until at the time $t_5$ with a completely engaged clutch 5, the rotational speed $n_{VM}$ of the internal combustion engine 1 corresponds to the speed $n_{EM}$ of the electric machine 2.

According to the diagram in FIG. 3, between the times $t_1$ and $t_5$, the internal combustion engine 1 is operated at a rotational speed that is sufficient to overcome the short circuit torque $M_{EM\text{-}KS\text{-}MAX}$ of the short circuited electric machine 2. In the process, if the short circuit torque $M_{EM\text{-}KS\text{-}MAX}$ of the short circuited electric machine 2 is greater than the maximum torque $M_{VM\text{-}MAX}$ that can be provided by the internal combustion engine 1, the internal combustion engine 1 is accelerated to a rotational speed $n_{VM}$, thereby enabling the rotational inertia of the internal combustion engine 1 to be utilized to overcome the short circuit torque of the short circuited electric machine 2 of the hybrid drive.

As already mentioned, while engaging the clutch 5, which is connected between the internal combustion engine 1 and the electric machine 2, the resulting rotational speed $n_{VM}$ of the internal combustion engine 1 is monitored, wherein when this rotational speed falls below a limit value, particularly, below its idle speed, the clutch 5 is disengaged again, in order to prevent stalling the internal combustion engine 1, and to subsequently repeat the start-up procedure by increasing the rotational speed $n_{VM\text{-}KS}$.

The increased rotational speed $n_{VM\text{-}KS}$ can be stored as an adaptation value for a subsequent start-up procedure with a short circuited electric machine. However, at defined intervals, for example, after a defined number of hours of operation or kilometers driven, the adaptation value can be reduced again in order to take into account, for example, a changed behavior of the electric machine 2, particularly a changed short circuit behavior of the same, and/or of the internal combustion engine 1 and/or the clutch 5, for example, as a consequence of wear.

Subsequent to engaging the clutch 5, connected between the internal combustion engine 1 and the electric machine, starting with the time $t_5$, the internal combustion engine 1 is brought to a rotational speed, depending on the desire of the driver, or to the start-up speed $n_{VM-AN}$, and the start-up element 6, which in the embodiment of FIG. 1 is designed as a clutch K2 disposed internally or externally to the transmission, is engaged. When the start-up element 6 or the clutch K2 is completely engaged, it transfers the desired start-up torque $M_{AN}$ that depends on what the driver desires.

Temporally in parallel to the engagement of the clutch 5, which is connected between the internal combustion engine 1 and the electric machine 2, between the times $t_2$ and $t_5$, the start-up element 6 can be closed partially up to the contact point, and therefore, already at time $t_5$ the start-up element is partially closed up to its contact point.

| Reference Characters | |
|---|---|
| 1 | Internal combustion engine |
| 2 | Electric machine |
| 3 | Output drive |
| 4 | Transmission |
| 5 | Clutch |
| 6 | Clutch |

The invention claimed is:

1. A method of operating a drive train of a motor vehicle, the drive train comprising a hybrid drive including an internal combustion engine and an electric machine, a clutch being connected between the internal combustion engine of the hybrid drive and the electric machine of the hybrid drive, a transmission being connected between the electric machine of the hybrid drive and an output drive of the drive train, and a start-up element, disposed one of internally and externally of the transmission, being connected between the electric machine of the hybrid drive and the output drive, the method for starting-up the drive train when the clutch, connected between the internal combustion engine and the electric machine and the start-up element one of internally and externally to the transmission, are disengaged, and the electric machine being stopped and short circuited, the method comprising the steps of:

accelerating the internal combustion engine to a rotational speed which depends on a short circuit torque of the electric machine to be overcome;

engaging the clutch connected between the internal combustion engine and the electric machine;

bringing the internal combustion engine to a rotational speed that depends on a request of a drive; and engaging the start-up element disposed one of internally and externally to the transmission.

2. The method according to claim 1, further comprising the step of partially engaging the clutch, connected between the internal combustion engine and the electric machine, up to a contact point at least partially at the same time as the step of accelerating the internal combustion engine to the rotational speed which depends on the short circuit torque of the electric machine to be overcome.

3. The method according to claim 1, further comprising the steps of monitoring the rotational speed of the internal combustion engine while engaging the clutch connected between the internal combustion engine and the electric machine; and disengaging the clutch connected between the internal combustion engine and the electric machine and restarting the start-up procedure by increasing the rotational speed, which depends on the short circuit torque of the electric machine to be overcome, when the rotational speed of the internal combustion engine falls below a limit value.

4. The method according to claim 3, further comprising the step of storing the increased rotational speed of the internal combustion engine, which is dependent on the short circuit torque to be overcome, as an adaptation value for a start-up when the electric machine is short circuited.

5. The method according to claim 4, further comprising the step of reducing the adaption value at defined intervals.

6. The method according to claim 2, further comprising the step of completely engaging the clutch, connected between the internal combustion engine and the electric machine, starting from the contact point such that the internal combustion engine and the electric machine operate at the same rotational speed.

7. The method according to claim 1, further comprising the step of completely engaging the driven start-up element that is disposed one of internally and externally to the transmission.

8. The method according to claim 7, further comprising the step of partially engaging the start-up element up to a contact point at least partially at the same time as the step of engaging the clutch connected between the internal combustion engine and the electric machine.

* * * * *